Dec. 15, 1931.  H. R. MAZURIE  1,837,169
PROTECTOR FOR PIPE ENDS
Filed March 26, 1930

INVENTOR.
Harry R Mazurie
by Usina & Rauber
his ATTORNEYS.

Patented Dec. 15, 1931

1,837,169

UNITED STATES PATENT OFFICE

HARRY R. MAZURIE, OF PITTSBURGH, PENNSYLVANIA, ASSIGNOR TO NATIONAL TUBE COMPANY, A CORPORATION OF NEW JERSEY

PROTECTOR FOR PIPE ENDS

Application filed March 29, 1930. Serial No. 439,160.

This invention relates to a protector for joint pipe and analogous conduit structures and is particularly adapted for the protection during transit of pipe sections of comparatively light construction, such as victaulic joint type, wherein the joining ends of the pipe sections are doubled over and which are susceptible to injury during transit, the pipe being easily knocked out of round and the ends liable to become damaged through rubbing together and chafing. It is, therefore, essential that such pipe be stoutly and efficiently protected during handling and when in transit, and the structure herein disclosed has been devised with this end in view.

In the drawings—

Figure 1:
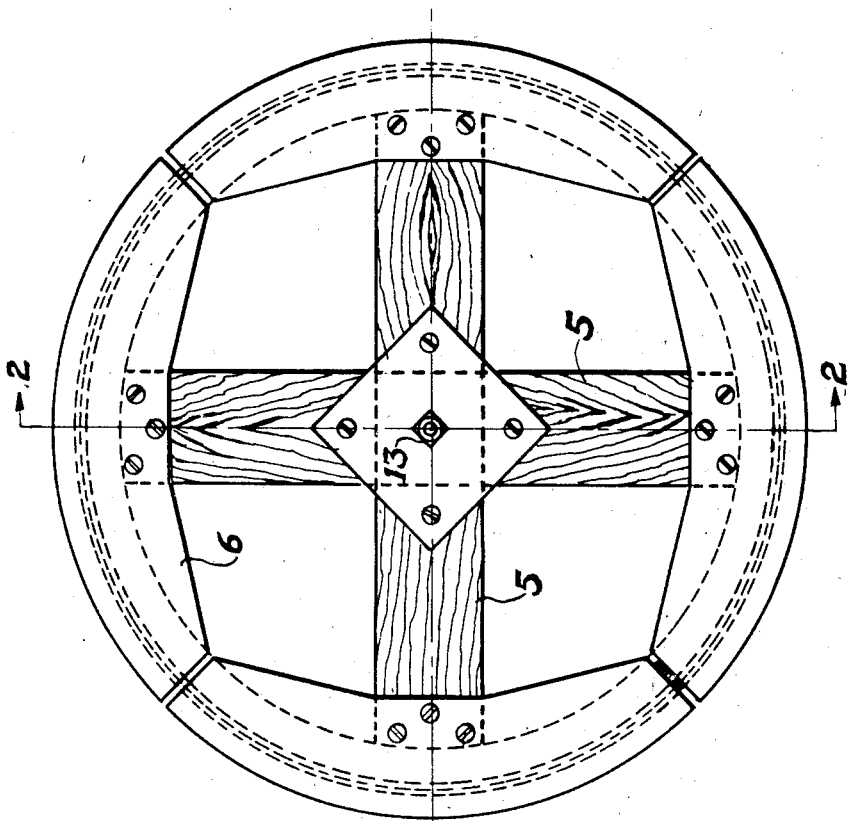
Figure 1 is an end elevation of a preferred construction embodying the features of the invention shown applied to a pipe section.
Figure 2:
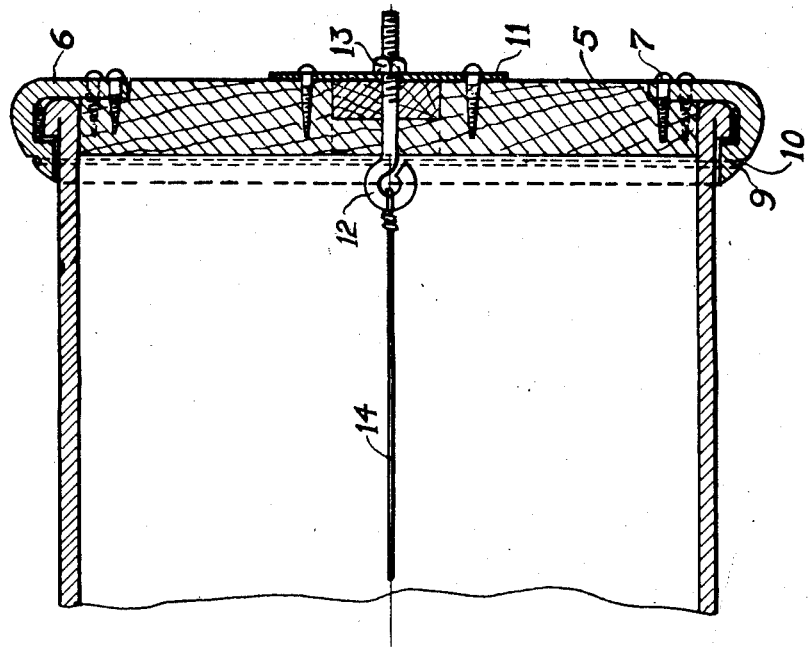
Figure 2 is a transverse vertical sectional view taken on the line 2—2 of Figure 1.

The numeral 5 designates cross pieces, herein shown as comprised of wood but which may be of any suitable material, dimensioned to have a snug sliding fit on the inside diameter of the pipe to be protected and formed with shouldered outer end portions to receive protecting members shown in the form of segments 6, preferably of metal such as cast iron, which are suitably secured to said cross pieces as by screws 7.

The segments 6 are formed or cast with an inner recess of a proper size to accommodate the doubled-over ends of the pipe sections, and in said recess it is preferred to place a strip of cushioning material 8, such as corrugated paper board or the like, which absorbs shocks due to blows and shifting movements during transit and through rough handling and protects the surface of the pipe from chafing and rubbing. The backs of the segments 6 are of rounded or beveled construction, to thus divert the force of direct blows due principally to endwise shifting movement of the pipe sections.

The sections 6 are preferably cast with a groove 9, in which is placed a tie wire 10, which may be wrapped around the segments and the ends twisted and forced in between two adjoining segments.

A drilled supporting plate 11 is shown secured on the central portions of the cross pieces 5, and through this plate and said pieces an eye-bolt 12 is passed and secured by a nut 13, a connecting wire 14 being passed through the pipe section and attached at each end to the eye-bolt of each protector, to prevent displacement of the latter and dropping off while in tansit.

In applying the improved form of protector to the ends of the pipe sections, the cross pieces 5 may be driven lightly into the insides of the pipe end and the segmental protectors drawn up snugly with a draw band clamp before the screws or like fastenings 7 are driven or screwed in secured position.

It will be understood that the improved protector structure may be placed in service wherever applicable and that obvious modifications and alterations in construction may be adopted without departing from the scope of the appended claims.

I claim—

1. A protective device for sectional pipe and the like comprising segmental end protectors which are formed with an inner recessed portion to receive a pipe end and an outer beveled surface adapted to divert the force of direct blows.

2. A protective device for sectional pipe and the like comprising a supporting frame adapted to fit the inside diameter of the pipe, and arcuate end cover members adapted to fit the outside diameter of the pipe, said cover members being formed with an inner recess to receive the end of the pipe and an outer groove to receive a tie member.

3. A protective device for sectional pipe and the like comprising cross pieces adapted to fit the inside diameter of the pipe, segmental arcuate-shaped end protectors adapted to fit the outside diameter of the pipe, means for removably securing said protectors to said cross pieces, and means for connecting such device to another on the opposite end of the pipe.

4. A protective device for sectional pipe and the like comprising cross pieces adapted to fit the inside diameter of the pipe, segmental arcuate-shaped end protectors adapted to fit the outside diameter of the pipe, means for removably securing said protectors to said cross pieces, a supporting plate secured to the central portion of said cross pieces, and means secured to said plate for connecting such device to another on the opposite end of the pipe section.

5. A protective device for sectional pipe and the like comprising cross pieces adapted to fit the inside diameter of the pipe, segmental arcuate-shaped end protectors having an inner recess to receive a pipe end and an outer beveled surface adapted to divert the force of direct blows, means for removably securing said protectors to said cross pieces, and means for connecting such device to another on the opposite end of the pipe.

In testimony whereof, I have hereunto set my hand.

HARRY R. MAZURIE.